United States Patent Office 2,883,350
Patented Apr. 21, 1959

2,883,350

CELLULOSIC VARNISHES AND PAINTS

Paul Baudecroux, L'Etang-la-Ville, France; Rica Juliette Sebbah Baudecroux, widow and heir of said Paul Baudecroux, deceased, and guardian of Jean Paul Baudecroux and Micheline Rosemonde Baudecroux, minor heirs No Drawing. Application October 1, 1956
Serial No. 612,959

Claims priority, application France October 10, 1955

7 Claims. (Cl. 260—17)

This invention is for improvements in or relating to cellulosic varnishes and paints.

Cellulosic varnishes and paints more often than not contain opacifying agents constituted by pigments or fillers of natural or artificial origin. White fillers, such as titanium dioxide and zinc oxide, are currently employed.

These opacifying agents, having more or less covering power, require intensive grinding without, however, making it possible to avoid their settling at the bottom of the receptacles containing the varnishes or paints.

The result is that the original tint of the varnish or paint is rendered uneven, and the contents of the receptacle assume a chalky appearance which does not tempt the buyer.

In order to obviate the grinding of pigments when preparing the varnishes and paints, and to avoid losses due to evaporation, as well as risks of fire, and the necessity of having costly equipment, it has been proposed to provide users with pigments or fillers, particularly in the case of titanium dioxide, in the form of scales (commonly referred to in the art as "chips") containing the pigment ground to the degree of fineness required, as well as a plasticiser or mixture of plasticisers or analogous ingredients. Whilst it is true that in this way, manufacturers of paints and varnishes are relieved of the above-mentioned difficulties, the pigments and fillers still tend to settle and shaking the varnish or paint is still indispensible when it is to be used; this is awkaward to carry out in the case of varnishes, such as nail varnishes, which are generally contained in small narrow-necked bottles.

It has also been attempted, without great success, to employ only pigments of low density or to employ stabilisers to maintain the heavy pigments in suspension.

The present invention has for an object to overcome these various drawbacks and, particularly, to produce cellulosic varnishes and paints which result, after drying, in films of a uniform opacity, and in which there occurs no sedimentation, to prepare these products whilst avoiding, moreover, all necessity of grinding.

This object is attained by providing a process of incorporating the opacifying substances into the varnish or paint which differs fundamentally from the method of introducing solid particles hitherto used. The process of the present invention consists, broadly, in using as opacifiers, metallic salts which are soluble in the volatile part of the varnish or paint, so that these salts, or their transformation products, separate in an extremely divided form, when the solvent which held them in solution has evaporated, and so that their infinite particles are distributed in a homogeneous manner throughout the entire mass of the film produced on drying the varnish or paint. It will be understood that all grinding operations are eliminated and that the opacifying particles can be in a state of subdivision which even the most careful grinding could not produce.

It is known, in particular, that the lower aliphatic alcohols, especially ethyl alcohol, have a good property as solvent in respect of numerous metallic salts. The invention comprises particularly the utilisation of these alcohols, above all ethyl alcohol, conjointly with the utilisation of the metallic salts which are soluble therein, as constituents of cellulosic varnishes and paints.

The invention further comprises, moreover, by way of novel industrial products, cellulosic varnishes and paints which include a lower aliphatic alcohol or a mixture of lower aliphatic alcohols, more especially ethyl alcohol, in their volatile part, and one or more metallic salts soluble in the alcohol or alcohols in question.

For the choice of the metallic salts to be used, one can be guided by indications contained in literature relating to the solubility of metallic salts in alcohols, taking into account the shade required for the film (see, for example, Herz and Knoch, "Zeitschrift für anorganische und allgemeine Chemie," 1907, 52, 171). In general, one can utilise the salts, particularly the halides, of alkali metals, such as lithium, of alkaline earth metals, such as calcium, and other common or precious metals such as zinc, cobalt and iron, as well as elements, such as silicon (silicon tetra-chloride); amongst the halides, the chlorides are to be preferred, the bromides coming next and after them the iodides.

The salts which are the most advantageous, both because of their opacifying effect as also for reasons of cost, are the salts of lithium, lithium chloride being preferred. Lithium chloride applied in accordance with the invention has covering and opacifying properties much superior to those of the finest titanium dioxides of the trade. It further has the advantage, if it is not accompanied by coloured ingredients, of producing a white film, so that it is sufficient to make use of the colours of other ingredients of the varnish or paint, particularly any colouring matter added intentionally, to obtain films having any shade desired.

The invention, however, is not limited to the utilisation of lithium chloride or other salts of this metal, and relates, in a general manner, to the utilisation, singly or in combination of metallic salts soluble in the alcohol chosen as constituent of the volatile part of the varnish or paint.

The proportion of metallic salts in the varnish or paint varies according to the effect aimed at and may range from very low values to the value corresponding to the saturation of the alcoholic solution.

In the particular case of lithium chloride and 90% by volume ethyl alcohol as diluent in the varnish or paint, the most favourable proportions by weight of chloride in relation to the total weight of the varnish or paint range from 0.25 to 4%.

The invention applies more particularly to nail varnishes which are normally constituted by a film-forming mixture based on cellulose derivatives, dispersed in a liquid mixture serving as solvent-plasticiser, or as solvent-plasticiser-diluent.

Generally, the cellulose derivative is nitrocellulose, but other esters of cellulose, such as the triacetate, acetopropionate or acetobutyrate, or a cellulose ether, such as ethyl cellulose or benzyl cellulose may be used. Apart from such a cellulose derivative, the film-forming mixture may also include one or more natural resins (for example, shellac, dammar or sandarac) or artificial resins (for example, polyvinyl resins, polystyrene resins or coumarone resins).

The liquid mixture contains volatile solvents which may be of the category of aliphatic and aromatic hydrocarbons, esters, particularly esters of lower aliphatic acids, such as formates, acetates and propionates, ketones or aldehydes, as well as liquids of higher boiling point, or solids, which act more especially as plasticisers (glycol esters, triaryl phosphates and phthalates). Finally, the mixture often contains, in a fairly large proportion, an alcohol acting as diluent, more often concentrated ethyl alcohol (at least of 90%, particularly of 95-96%), or absolute alcohol.

All these varnishes are suitable for the addition of opacifying agents applied according to the invention, with the help of, if necessary, the addition of an alcohol if they do not contain any, or a supplement of alcohol if they do not contain enough thereof to act as the vehicle for the required amount of opacifying agent to obtain the desired effect.

It is particularly convenient, for the production of the varnish or of the paint, initially to dissolve the opacifying agent in the alcohol chosen and to use the alcoholic solution of the opacifying agent in the same manner as one would utilise the alcohol alone to make a varnish or a paint.

The following example illustrates the invention in the particular case of this method of making a nail varnish:

*Example*

In order to obtain a varnish of the following composition:

| | |
|---|---|
| Ethyl alcohol 90% | 43 ccs. (35 g.) |
| Lithium chloride | 2 g. |
| Isobutyl propionate | 30 ccs. (26 g.) |
| Coumarone resin | 5 g. |
| Dry "half-second" nitrocellulose | 15 g. |
| Tricresyl phosphate | 5 g. | the lithium chloride is dissolved in the alcohol, then the other ingredients are added to the alcoholic solution, the whole being intermittently agitated to form a homogeneous mixture.

A clear and transparent colloid is obtained, which does not form any deposits even when stored for several years; once applied, it forms a white porcelain-like film when dry. The adjustment to the desired shade can be effected by means of the usual soluble colouring agents.

Once the film is dry, the lithium compound therein is in a state of extreme subdivision and is distributed evenly therethrough. Its state of division is such that the particles cannot be seen by means of an ordinary microscope.

The example is not limiting as to the nature and the proportions of the constituents; an example relating to a sole solvent, isobutyl propionate, in addition to the alcohol and the plasticiser, has been chosen intentionally in order to show that the invention can be applied even to varnishes of not very customary composition. The lithium chloride is quite as efficacious in the case of conventional varnishes in which the solvent is based on ethyl acetate, amyl acetate, acetone, benzene or toluene.

Instead of initially forming an alcoholic solution of the opacifying agent, as has been described, it is possible to incorporate it either as such or admixed with one or more dyes to the mixture of the other ingredients of the varnish.

Thus, for example, it is possible to prepare dry, according to any of the conventional techniques, a homogeneous mixture of a dye, or mixture of dyes and lithium chloride, for example in the proportion by weight of 5:40, then to incorporate the mixture into a varnish or paint containing ethyl alcohol. Instead of preparing this mixture dry, the dye or mixture of dyes and lithium chloride may be dissolved, in the same relative proportion, in one of their mutual solvents, for example in anhydrous or aqueous alcohol, the solution then being evaporated to dryness and collecting the coloured lithium chloride which can then be incorporated in a varnish or paint containing an alcohol.

In general, opacifying can be effected in the manner described, of all commercial cellulose varnishes and paints containing alcohol, especially those which do not include opacifiers.

What I claim is:

1. A process for opacifying a cellulosic varnish selected from the class consisting of cellulose ester varnishes and cellulose ether varnishes and containing a lower aliphatic alcohol as an extender, which comprises incorporating lithium chloride into said varnish.

2. A process for opacifying a cellulosic varnish selected from the class consisting of cellulose ester varnishes and cellulose ether varnishes and containing ethyl alcohol having a strength of not less than 90 percent by volume as an extender, which process comprises incorporating lithium chloride into said varnish.

3. In the process of making a cellulosic varnish from a substance selected from the group consisting of cellulose esters and cellulose ethers, a solvent therefor and an extender, the step of employing as an extender a solution of lithium chloride in a lower aliphatic alcohol.

4. In the process of making a cellulosic varnish from a substance selected from the group consisting of cellulose esters and cellulose ethers, a solvent therefor and an extender, the step of employing as an extender a solution of lithium chloride in ethyl alcohol having a strength of not less than 90 percent by volume.

5. A cellulosic varnish selected from the class consisting of cellulose ester varnishes and cellulose ether varnishes, which contains 0.25 to 4 percent of the weight thereof of lithium chloride and so much of a lower aliphatic alcohol as to hold said lithium chloride dissolved therein.

6. A cellulosic varnish selected from the class consisting of cellulose ester varnishes and cellulose ether varnishes, which contains 0.25 to 4 percent of the weight thereof of lithium chloride and so much of ethyl alcohol having a strength of not less than 90 percent by volume as to hold said lithium chloride dissolved therein.

7. A nail varnish composition which consists of 35 parts of 90 percent ethyl alcohol, 2 parts of lithium chloride, 26 parts of isobutyl propionate, 5 parts of coumarone resin, 15 parts of dry half-second nitrocellulose and 5 parts of tricresyl phosphate, all parts being by weight.

References Cited in the file of this patent

UNITED STATES PATENTS

| | | |
|---|---|---|
| 2,313,076 | Klinkenstein et al. | Mar. 9, 1943 |
| 2,377,840 | Healy | June 5, 1945 |
| 2,662,028 | Fenton | Dec. 8, 1953 |

FOREIGN PATENTS

| | | |
|---|---|---|
| 648,137 | France | Aug. 7, 1928 |
| 277,989 | Great Britain | Feb. 22, 1929 |

OTHER REFERENCES

The Condensed Chemical Dictionary, Reinhold, 4th edition, 1950, page 402.